United States Patent [19]

Arbit

[11] 4,387,012
[45] Jun. 7, 1983

[54] BLENDS OF POLY(P-METHYLSTYRENE) WITH POLYFUNCTIONAL MONOMER AND SHAPED ARTICLE

[75] Inventor: Harold A. Arbit, Highland Park, N.J.

[73] Assignee: Mobil Oil Corporation, New York, N.Y.

[21] Appl. No.: 282,304

[22] Filed: Jul. 10, 1981

Related U.S. Application Data

[60] Division of Ser. No. 174,402, Aug. 1, 1980, Pat. No. 4,281,083, which is a continuation-in-part of Ser. No. 971,179, Dec. 20, 1978, abandoned.

[51] Int. Cl.³ .................. C08F 257/02; C08F 2/54
[52] U.S. Cl. .................. 204/159.17; 521/50; 521/139; 521/82
[58] Field of Search .................. 204/159.17; 521/139

[56] References Cited

U.S. PATENT DOCUMENTS

| | | | |
|---|---|---|---|
| 3,068,191 | 12/1962 | Seito et al. | 260/886 |
| 3,145,528 | 8/1964 | D'Alelio | 204/159.17 |
| 3,852,177 | 12/1974 | Atchison et al. | 204/159.17 |
| 4,086,287 | 4/1978 | Kaeding et al. | 260/671 R |
| 4,152,231 | 5/1979 | St. Clair et al. | 204/159.17 |

*Primary Examiner*—Carman J. Seccuro
*Attorney, Agent, or Firm*—Charles A. Huggett; Michael G. Gilman; Edward J. Trojnar

[57] ABSTRACT

There is provided a blend of poly(p-methylstyrene) with a small amount of a polyfunctional monomer, such as trimethylolpropane trimethacrylate. The blend can be formed into shaped articles, such as food containers, which can be crosslinked by irradiation at low doses. Such irradiated articles are resistant to microwave oven conditions.

1 Claim, No Drawings

BLENDS OF POLY(P-METHYLSTYRENE) WITH POLYFUNCTIONAL MONOMER AND SHAPED ARTICLE

CROSS-REFERENCE TO RELATED APPLICATIONS

This is a division of copending application Ser. No. 174,402, filed Aug. 1, 1980, now U.S. Pat. No. 4,281,083, which is a continuation-in-part of copending application Ser. No. 971,179, filed Dec. 20, 1978, now abandoned.

BACKGROUND OF THE INVENTION

1. Field of the Invention

This invention is concerned with blends of poly(p-methylstyrene) with polyfunctional monomers, which can be crosslinked by ionizing radiation at low dosage levels.

2. Description of the Prior Art

Insofar as is now known, the blends of this invention have not been proposed. Surprisingly, corresponding blends with polystyrene are not crosslinked by radiation.

SUMMARY OF THE INVENTION

This invention provides blends of poly(p-methylstyrene) with between about 0.1 weight percent and about 10 weight percent of a polyfunctional monomer.

It also provides a method of making shaped articles that are resistant to fatty foods under microwave oven conditions, that comprises forming a blend of poly(p-methylstyrene) with between about 0.1 weight percent and about 10 weight percent of a polyfunctional monomer into a foamed or unfoamed sheet, thermoforming said sheet to produce a shaped article, and irradiating the shaped article with sufficient ionizing radiation to effect crosslinking sufficient to render the shaped article resistant to fatty foods under microwave oven conditions.

DESCRIPTION OF THE SPECIFIC EMBODIMENTS

The monomer used in preparing the homopolymer or copolymers from which the blends of this invention are made is p-methylstyrene. It is within the contemplation of this invention to use mixtures of methylstyrene rich in p-methylstyrene. Such mixtures contain at least 90 weight percent, preferably at least 95 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolymers containing between about 10 and about 1 weight percent conjugated diene, such as butadiene and isoprene. The polymerization reaction is carried out by using methods and catalysts well known in the art for polymerizing styrene. The reaction can be carried out in solution, bulk, suspension, or emulsion.

In accordance with this invention, the material that is blended with the poly(p-methylstyrene) is a polyfunctional (polyunsaturated) monomer. Typical monomers contemplated are divinylbenzene; neopentylglycol diacrylate; neopentylglycol dimethacrylate; trimethylolpropane triacrylate; trimethylolpropane trimethacrylate; allyl methacrylate; pentaerythritol tiracrylate; pentaerythritol tetramethacrylate; bisphenol-A dimethacrylate; butylene glycol dimethacrylate; tetraethyleneglycol diacrylate; 1,6-hexanediol dimethacrylate; 1,6-hexanediol diacrylate; diethyleneglycol diacrylate; diethyleneglycol dimethacrylate; n-hexenyl methacrylate; polyethyleneglycol dimethacrylate; tetraethyleneglycol dimethacrylate; ethyleneglycol dimethacrylate; diethylene glycol dimethacrylate; diallyl fumarate; diallyl phthalate; triallyl trimellitate; and tetralyl pyromellitate.

Small amounts of polyfunctional monomers are effective to induce crosslinking by radiation at low dosage level. Generally, between about 0.1 weight percent and about 10 weight percent, preferably between about 0.5 weight percent and about 5 weight percent, will be used. Blending can be effected in a variety of ways, such as in solution in aromatic solvents, such as toluene, from which sheets or films can be cast. The blend components can be mixed in a tumbling agitator and fed into an extruder to produce sheets, films, or foamed sheets, or they can be fed separately to an extruder for extruder blending.

The blends of this invention can be formed into sheets, films, or foamed sheets and thermoformed to produce shaped articles, such as food containers. After being irradiated, such shaped articles are heat resistant and are not affected by fatty foods under microwave oven conditions.

Ionizing radiation is inclusive of extremely short-wavelength, high energetic, penetrating rays such as gamma rays, X-rays, and subatomic particles accelerated in cyclotrons, betatrons, synchrotrons, and linear accelerators. The effect of irradiating the shaped articles is to cross-link the poly(p-methylstyrene) blend. The irradiation dose can be between about 5 megarads and about 30 megarads, whereas poly(p-methylstyrene) requires between about 50 megarads and about 60 megarads. Similar blends using polystyrene are not crosslinked at low dosages.

EXAMPLE 1

Poly(p-methylstyrene) (PPMS), containing 3% meta isomer and 0.1% ortho isomer, was dissolved in toluene at a concentration of 25 weight percent. Then, 5 weight percent trimethylolpropane trimethacrylate (TMPTMA) based on solids weight was added and dissolved. Films were cast onto a smooth surface coated with polyethylene terephthalate and drawn down and dried to obtain a dried film thickness of about 2 mils. Film samples were irradiated by electron beam at various megarad (M Rads) doses. For each dosage level, crosslinking was determined by measuring solubility of the irradiated films in toluene at room temperature overnight. Any insoluble gel thus formed was filtered and dried to constant weight at 115° C. For comparison, films of polystyrene (PS) containing 5 weight percent of the TMPTMA used above were irradiated and tested for gel content. Pertinent data are set forth in the following Table I:

TABLE I

| Dose, M Rads | Gel Content, % 5% TMPTMA in | |
|---|---|---|
| | PPMS | PS |
| 0 | 0 | 0 |
| 2 | 0 | 0 |
| 12 | 9.1 | 0 |
| 22 | 70.2 | 0 |

From the data in Table I, it will be noted that at doses of about 20 M Rads substantial crosslinking of the blend of PPMS and TMPTMA took place as measured by gelation, whereas PS blends did not crosslink. With PPMS alone (unblended) doses in the order of 50–60 M Rads were required. Thus, using the blends of this invention considerable energy savings are effected.

EXAMPLE 2

Blends of PPMS and of PS each with 5 weight percent divinylbenzene (DVB) based on total solids were prepared by melt blending in a Brabender mixer at 200° C. for 5 minutes. Each blend was dissolved in methylene chloride (25 wt. % solution and on a polyethylene terephthalate sheet. The solvent was evaporated at 60° C. in a vacuum oven to yield 3-4 mil films. The films were irradiated by electron beam at two M Rads levels. Crosslinking was determined as described in Example 1. Pertinent data are set forth in Table II.

TABLE II

| Dose, M Rads | Gel Content, % 5% DVB in | |
|---|---|---|
| | PPMS | PS |
| 10 | 79.4 | 0.05 |
| 30 | 68.0 | 2.9 |

The data in Table II show that the blend of PPMS was substantially crosslinked at doses as low as 10 M Rads.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A method of making a shaped article that is resistant to fatty foods under microwave oven conditions, that comprises forming a blend consisting essentially of poly(methylstyrene) containing at least 90 weight percent poly(p-methyl styrene) with between about 0.1 weight percent and about 10 weight percent and about 10 weight percent of a polyfunctional monomer into a foamed or unfoamed sheet, thermoforming said sheet to produce a shaped article, and irradiating the shaped article with sufficient ionizing radiation to effect crosslinking sufficient to render said shaped article resistant to fatty foods under microwave oven conditions.

* * * * *